United States Patent [19]

Grau

[11] Patent Number: 4,568,939
[45] Date of Patent: Feb. 4, 1986

[54] ARRANGEMENT FOR COMPENSATION OF UNWANTED ECHOES CAUSED BY THE MOVEMENT OF A RADAR DEVICE

[75] Inventor: Alfred Grau, Schliern-Köniz, Switzerland

[73] Assignee: Siemens Albis Aktiengesellschaft, Zürich, Switzerland

[21] Appl. No.: 438,455

[22] Filed: Nov. 1, 1982

[30] Foreign Application Priority Data

Nov. 11, 1981 [CH] Switzerland ............... 7242/81

[51] Int. Cl.$^4$ ............................................. G01S 13/58
[52] U.S. Cl. ....................................... 343/8; 343/7 PL
[58] Field of Search ................... 343/7 PL, 17.7, 8

[56] References Cited

U.S. PATENT DOCUMENTS 4,062,011 12/1977 Preston et al. ............... 343/7 A
4,335,383 6/1982 Berry ............................ 343/7 PL Primary Examiner—S. C. Buczinski
Assistant Examiner—K. R. Kaiser
Attorney, Agent, or Firm—Werner W. Kleeman

[57] ABSTRACT

In order to compensate the unwanted echo caused by the movement of a moving radar device, an arrangement is provided between the output of a coherent oscillator and the input of a phase discriminator. This arrangement comprises a signal processing stage containing two series-connected phase regulating circuits, namely phase-locked loops. The output signal of the first phase-locked loop displays a mixed frequency which is formed by the sum of the frequency of the output signal of a signal generator and a displacement frequency modulated by the Doppler frequency of the unwanted echo caused by the movement of the radar device. In the second phase-locked loop the output signal of the first phase-locked loop is mixed with a further signal containing the displacement frequency.

5 Claims, 3 Drawing Figures

4,568,939

ARRANGEMENT FOR COMPENSATION OF UNWANTED ECHOES CAUSED BY THE MOVEMENT OF A RADAR DEVICE

BACKGROUND OF THE INVENTION

The present invention relates to an improved arrangement for compensating the unwanted echoes, caused by the movement of a moving radar device.

Generally speaking, the arrangement for compensating the unwanted echo caused by a moving radar device, comprises a mixing device provided between the output of a coherent oscillator and the input of a phase discriminator. The mixing device comprises a series circuit composed of a first mixer, a first filter, a second mixer and a second filter. There is also provided a signal processing stage containing two series-connected mixing circuits, each of which mixing circuits delivers a signal, the frequency difference of which corresponds to the value of the Doppler frequency of the unwanted echo caused by the movement of the moving radar device. The first signal of the mixing circuits is supplied to the first mixer and the second signal of the mixing circuits to the second mixer of the mixing device. The frequency of the output signal of the first mixing circuit is formed by addition of the Doppler frequency of the unwanted echo caused by the movement of the moving radar device.

When using radar devices in mobile equipment there of course occur the aforementioned unwanted echos which must then be compensated when the inherent speed of the antenna is not negligibly small in comparison to that of a target.

From German Pat. No. 2,133,395 a Doppler radar device with fixed target suppression or cancellation is already known, wherein an arrangement to compensate the own movement of the transmitting/receiving antenna is provided between the output of the coherent oscillator and the input of a phase discriminator. This compensation arrangement consists of a signal processing stage and a mixing device, which is formed by the series circuit of a first mixer, a first filter, a second mixer and a second filter. The signal processing stage has a first mixing circuit, the output of which supplies a mixed signal which is fed to the input of a second mixing circuit, the output of which is connected to a further input of the second mixer of the mixing device. The frequency of this mixed signal corresponds to the sum of the coherent oscillator frequency, the self-movement Doppler frequency and an additional displacement frequency, which for reasons of symmetry is chosen at about Fr/4, Fr being the repetition frequency of the emitted pulses. The first mixing circuit delivers a further output signal, which is supplied to a further input of the first mixer of the mixing device.

The arrangement known from the aforementioned German Pat. No. 2,133,395 operates in such a manner that the signals reflected by targets are compared with regard to phase with the output signal of a coherent oscillator, and only those signals, the phase of which changes in relation to the coherent oscillator during two successive rotations of the antenna, are recognized as signals of moving targets, evaluated and indicated. In order to compensate the own movement, the relative velocity of the transmitting/receiving antenna to a stationary target is ascertained, and the frequency of the coherent oscillator is adjusted by the frequency of the Doppler shift or displacement belonging to this relative velocity, and the relative velocity is measured to a stationary target which is less far removed from the transmitting/receiving antenna than the target to be located.

SUMMARY OF THE INVENTION

Therefore, with the foregoing in mind it is a primary object of the present invention to provide an improved arrangement which effectively compensates unwanted echoes caused by the movement of a moving radar device.

Another and more specific object of the present invention is directed to an improved arrangement for compensating the unwanted echo caused by the movement of a moving radar device, wherein the information concerning the radial velocity of the boresight of the antenna is externally supplied.

Now in order to implement these and still further objects of the invention, which will become more readily apparent as the description proceeds, the compensation arrangement of the present development is manifested by the features that there is provided in the first mixing circuit a phase regulation circuit, in particular a phase-locked loop, the output signal of which possesses a frequency which is formed by the addition of the frequency of the output signal of a signal generator and a displacement or shift frequency modulated by the Doppler frequency of the unwanted echo caused by the movement of the moving radar device. Furthermore, in the second mixing circuit the output signal of this phase-locked loop and a further signal are mixed, wherein the frequency of the last-mentioned signal is equal to the displacement or shift frequency.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
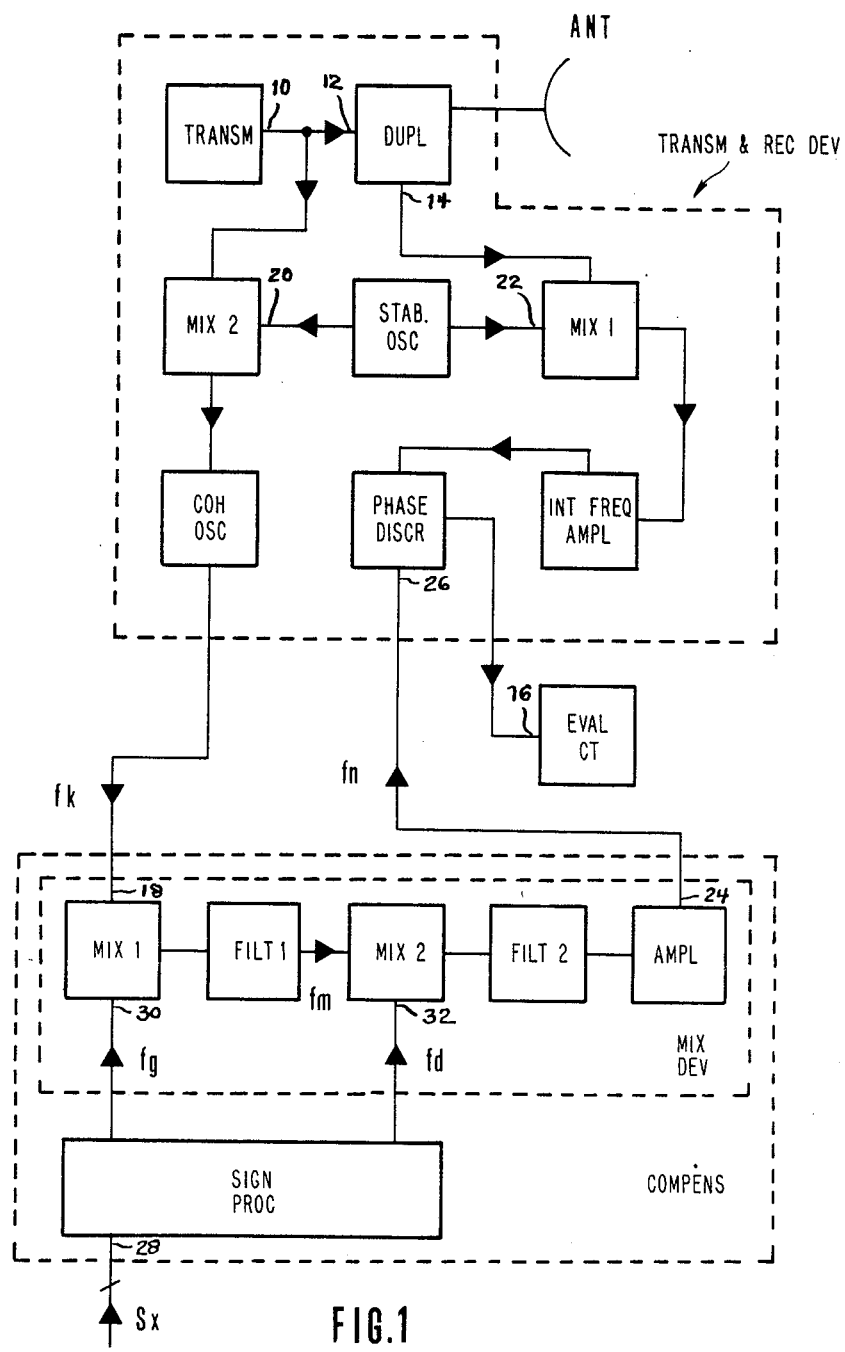
FIG. 1 is a block circuit diagram of a moving Doppler radar device containing a compensation arrangement according to the invention for compensating the unwanted echo caused by the movement of the moving Doppler radar device.

Describing now the drawings, the Doppler radar device shown in FIG. 1 comprises an antenna ANT, a transmitting/receiving device TRANS REC DEV, an evaluation circuit EVAL CT as well as a compensation arrangement COMPENS which comprises a signal processing stage SIGN PROC and a mixing device MIX DEV. The transmitting/receiving device TRANS REC DEV contains a transmitter TRANSM, the output 10 of which is connected to a first connection or terminal 12 of a duplexer DUPL which is connected to the antenna ANT. The output 14 of the duplexer DUPL is connected to the input 16 of the evaluation circuit EVAL CT by way of the series connection of a first mixing stage MIX 1, an intermediate-frequency amplifier INT FREQ AMPL and a phase discriminator PHASE DISCR. By way of the series connection of a second mixing stage MIX 2 and a coherent oscillator COH OSC, the transmitter TRANSM is furthermore connected to the input 18 of a mixer MIX 1 in the mixing device MIX DEV. Further inputs 20 and 22 of the mixing stages MIX 1 and MIX 2 of the transmitting and receiving device TRANS REC DEV in each instance receive an output signal of a stabilized oscillator STAB OSC. The mixing device MIX DEV consists of the series connection of the mixer MIX 1, a filter FILT 1, a second mixer MIX 2, a filter FILT 2 and an amplifier AMPL, the output 24 of which is connected to a further input 26 of the phase discriminator PHASE DISCR. The signal processing stage SIGN PROC which receives at its input side 28 a signal Sx, delivers two output signals Sg and Sd. The signal Sx has a frequency fc which is substantially identical to the Doppler frequency of the unwanted echo caused by the movement of the moving Doppler radar device. The signal Sg at the frequency fg and the output signal Sk at the frequency fk of the coherent oscillator COH OSC are mixed in the mixer MIX 1, and the signal Sd at the frequency $fd = fg \pm fc$ and the output signal Sm at the frequency $fm = fg \pm fk$ of the filter FILT 1 are mixed in mixer MIX 2.

The moving Doppler radar device according to FIG. 1 accordingly functions in such a manner that the mixing device MIX DEV supplies an output signal Sn, the frequency fn of which is $$fn = fd - fm = fg \pm fc - fg \pm fk = \pm(fk \pm fc)$$

and the frequency difference $fd - fg$ corresponds to the value of the Doppler frequency fc of the antenna movement and which is correlated with the plus or minus sign. When, for example, Vc is the relative speed to the ground of the antenna itself, then there applies for the Doppler frequency fc the equation $fc = 2 Vc/d$, wherein d is the wave length of the transmitting signal. Moreover, the method of operation of the radar device without the compensation arrangement COMPENS is known as such, which for the case that the frequency should be $fc = 0$, i.e. $fn = fk$, can be replaced by a direct connection between the output of the coherent oscillator COH OSC and the input of the phase discriminator PHASE DISCR.

Figure 2:
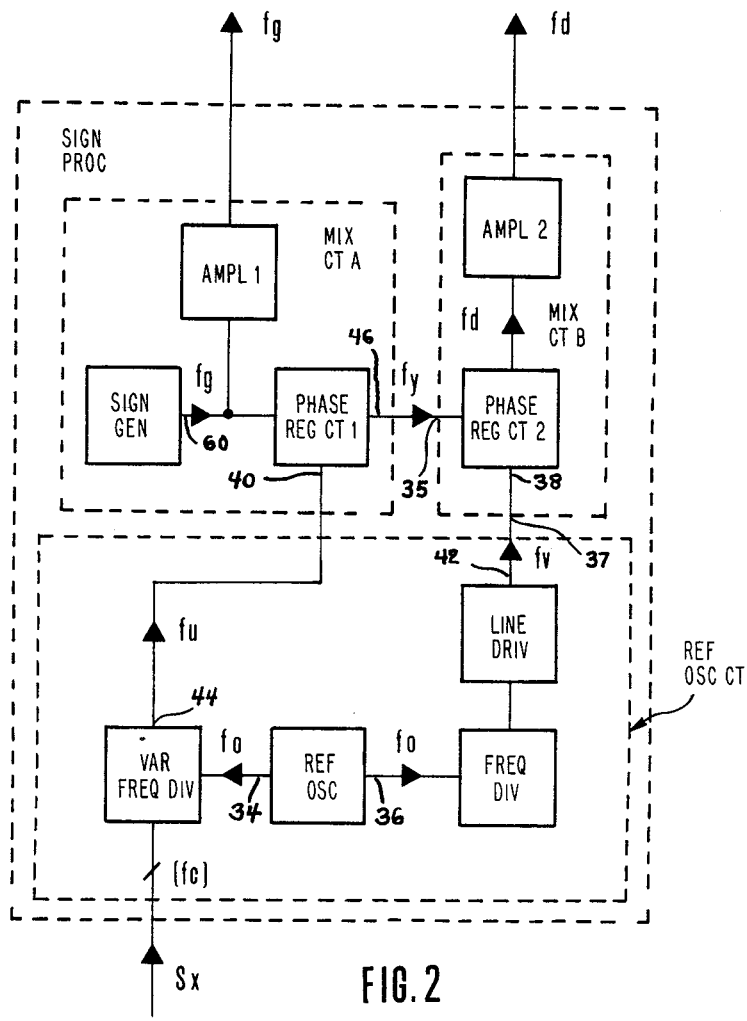
FIG. 2 is a block circuit diagram of a signal processing stage of the compensating arrangement depicted in FIG. 1.

The signal processing stage SIGN PROC according to the showing of FIG. 2 comprises in a first mixing circuit MIX CT A, a signal generator SIGN GEN, the output 60 of which is connected, on the one hand, by way of a first amplifier AMPL1 to the input 30 of the first mixer MIX 1 (FIG. 1), and, on the other hand, by way of the series connection of two phase regulation circuits, namely phase-locked loops PHASE REG CT 1 and PHASE REG CT 2 and a second amplifier AMPL 2 to the input 32 of the second mixer MIX 2. Furthermore, there is provided in the signal processing stage SIGN PROC a reference oscillator circuit REF OSC CT containing a reference oscillator REF OSC which generates the frequency fo at two decoupled outputs 34 and 36, wherein the one output 36 of which is connected to a second input 38 of the second phase-locked loop PHASE REG CT 2 i.e., to the coherent signal or second input 37 of a second mixing circuit or device MIX CT B, by way of the series connection of a frequency divider FREQ DIV and a line driver LINE DRIV which generate a second output signal of the reference oscillator circuit REF OSC CT. This second output signal has a frequency substantially identical with a displacement frequency fv. The other output 34 of the reference oscillator REF OSC is connected to a second input 40 of the phase-locked loop PHASE REG CT 1 by way of a variable frequency divider VAR FREQ DIV of the reference oscillator circuit REF OSC CT. The variable frequency divider VAR FREQ DIV is controlled by an 8-bit word signal obtained from the information concerning the radial velocity of the boresight of the antenna ANT, which signal corresponds to the Doppler frequency fc. The variable frequency divider VAR FREQ DIV produces a first output signal of the reference oscillator circuit REF OSC CT. This first output signal has a frequency substantially identical with the displacement frequency fv modulated by the Doppler frequency fc of the unwanted echo caused by the movement of the moving radar device. The signal processing stage SIGN PROC operates as follows: The reference oscillator REF OSC delivers a signal So of the frequency fo, which is divided in the divider FREQ DIV, so that at the output 42 of the driver LINE DRIV there appears a signal of the frequency fv. The signal So is divided in the divider VAR FREQ DIV in dependence on the signal Sx in such a manner that at the output 44 thereof there appears a signal of the frequency $fu = fv \pm fc$. The output 46 of the circuit of phase-locked loop PHASE REG CT 1 accordingly to a first input 35 of the second mixing circuit MIX CT B a signal of the frequency $fy = -fu + fg = fg + fv \pm fc$, in which fg and fv display constant values and fc a variable value. The phase-locked loops PHASE REG CT 1 and PHASE REG CT 2 contain, as is known, a low-pass which cannot readily be realized with a lower threshold frequency of $fa = 0$. In order to overcome this problem $fv = K \cdot fa$ is chosen, in which the factor K must be $> 1$, and may for example assume a value between 50 and 50000. The circuit or phase-locked loop PHASE REG CT 2 accordingly delivers an output signal, the frequency of which is $fd = fy - fv = fg + fv \pm fc - fv = fg \pm fc$. For the frequency of the output signal of the mixing device MIX DEV (FIG. 1) therefore the following applies:

$$fn = fd - fm = fk \pm fc.$$

Figure 3:
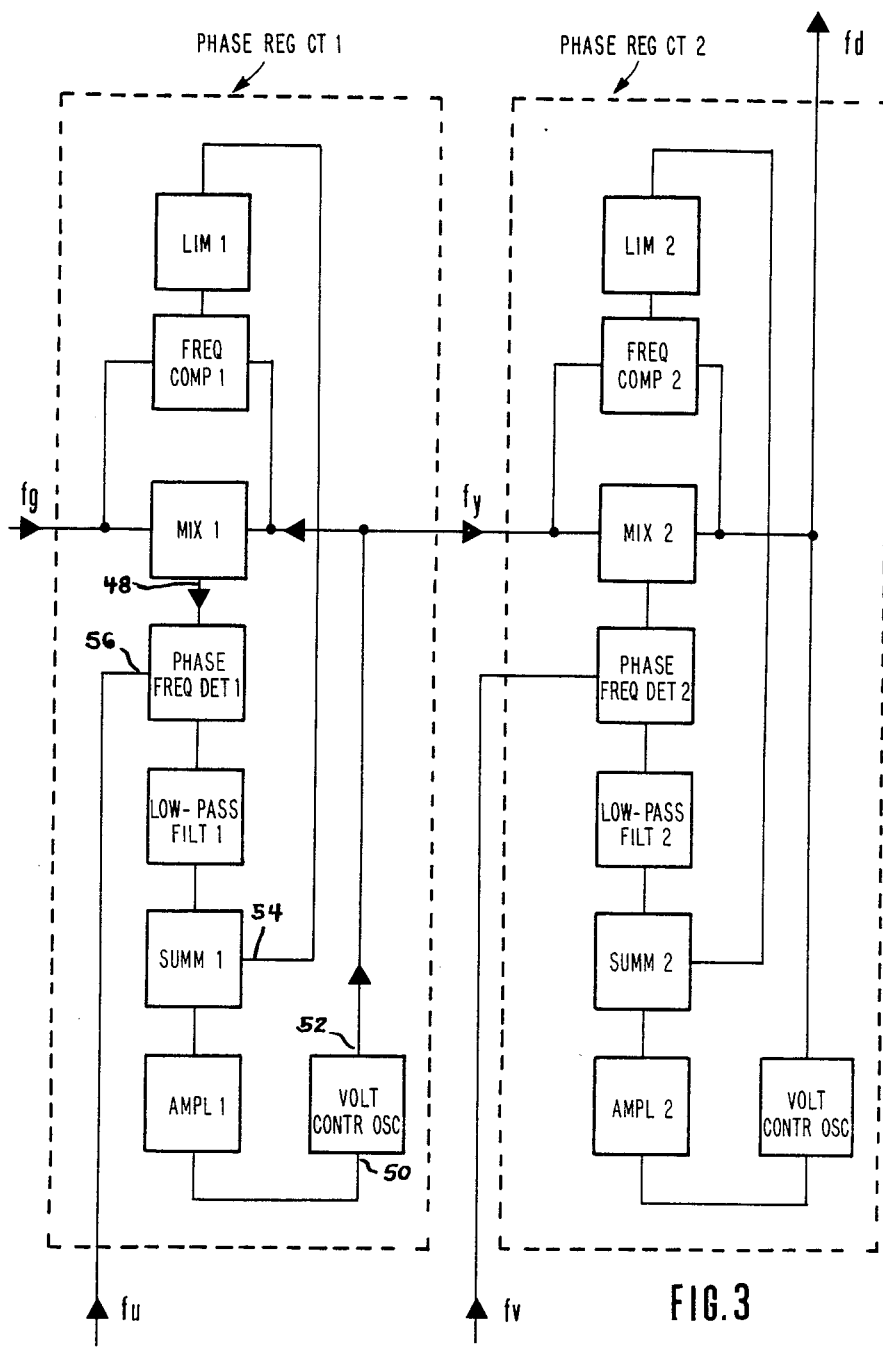
FIG. 3 is a block circuit diagram depicting two phase regulation circuits of such signal processing stage.

The circuit or phase-locked loop PHASE REG CT 1 according to FIG. 3 comprises a mixer MIX 1, the output 48 of which is connected, by way of the series connection of a phase frequency detector PHASE DET 1, a low-pass LOW-PASS FILT 1, a summation unit SUMM 1 and an amplifier AMPL 1, to the input 50 of a voltage-controlled oscillator VOLT CONT OSC 1, the output 52 of which delivers the signal Sy of the frequency fy. The mixer MIX 1 mixes the signals of the frequencies fo and fy, which furthermore are compared in a frequency comparator FREQ COMP 1, the output signal of which is supplied by way of a limiter LIM 1 to a second input 54 of the summation unit SUMM 1. The phase frequency detector PHASE FREQ DET 1 has a further input 56 for the signal of the frequency fu. When a voltage-controlled quartz oscillator is chosen which is stretchable in the frequency, the elements LIM 1, FREQ COMP 1 and SUMM 1 can be dispensed with. The same applies to the circuit PHASE REG CT 2, which can have a similar layout.

While there are shown and described present preferred embodiments of the invention, it is to be distinctly understood that the invention is not limited thereto, but may be otherwise variously embodied and practiced within the scope of the following claims. Accordingly,

What I claim is:

1. An arrangement for compensating the unwanted echo caused by the movement of a moving radar device containing a transmitter/receiver device possessing a coherent oscillator having an output and a phase discriminator having an input, said arrangement comprising:

a mixing device connected in circuit between the output of said coherent oscillator and the input of said phase discriminator;

said mixing device comprising a series connection of:
a first mixer;
a first filter;
a second mixer; and
a second filter;

a signal processing stage connected in circuit with said mixing device and containing a reference oscillator circuit generating a first output signal of a frequency substantially equal to a displacement frequency modulated by the Doppler frequency of the unwanted echo caused by the movement of the moving radar device;

said signal processing stage containing a first mixing circuit and a second mixing circuit which are series connected and each of which delivers a respective output signal, the frequency difference of which corresponds to the value of the Doppler frequency of the unwanted echo caused by the movement of the moving radar device;

the output signal of said first mixing circuit being delivered to the first mixer of said mixing device and the output signal of the second mixing circuit being delivered to the second mixer of said mixing device;

said first mixing circuit containing a signal generator delivering an output signal at an output of the signal generator and a phase-locked loop having an input connected with the output of said signal generator;

said phase-locked loop delivering an output signal having a frequency which is formed by adding the frequency of the output signal of the signal generator to said displacement frequency modulated by the Doppler frequency of the unwanted echo caused by the movement of the moving radar device;

said reference oscillator circuit generating a second output signal of a frequency substantially equal to said displacement frequency;

said second mixing circuit having a first input receiving said output signal of the phase-locked loop and a second input receiving said second output signal generated by said reference oscillator circuit.

2. The arrangement as defined in claim 1, wherein: said second mixing circuit contains a phase-locked loop.

3. The arrangement as defined in claim 2, wherein:
said reference oscillator circuit of said signal processing stage contains a reference oscillator delivering an output signal;
a frequency divider connected with said reference oscillator;
a variable frequency divider connected with said reference oscillator;
means for delivering to said variable frequency divider a signal corresponding to said Doppler frequency of the unwanted echo and for controlling said variable frequency divider as a function of said signal; and the output signal of said reference oscillator being delivered by means of said frequency divider to said second input of the second mixing circuit and by way of the variable frequency divider to a further input of the phase-locked loop of the first mixing circuit.

4. The circuit arrangement as defined in claim 1, wherein:
said reference oscillator circuit of said signal processing stage contains a reference oscillator delivering an output signal;
a frequency divider connected with said reference oscillator;
a variable frequency divider connected with said reference oscillator;
means for delivery to said variable frequency divider a signal corresponding to said Doppler frequency of the unwanted echo and for controlling said variable frequency divider as a function of said signal; and the output signal of said reference oscillator being delivered by means of said frequency divider to said second input of the second mixing circuit and by way of the variable frequency divider to a further input of the phase-locked loop.

5. An arrangement for compensating the unwanted echo caused by the movement of a moving radar device for determining the speed of a target vehicle and comprising:
a transmitter/receiver device;
said transmitter/receiver device containing a transmitter and an antenna operatively connected to said transmitter;
said antenna transmitting radiation to the target vehicle and receiving, from the target vehicle, reflected radiation containing the unwanted echo caused by the movement of the moving radar device;
a coherent oscillator operatively connected with said transmitter and generating an output signal of a predetermined frequency;
means for delivering an output signal of a frequency substantially identical with the frequency of said unwanted echo caused by the movement of the radar device;
a compensation arrangement connected to said coherent oscillator and to said means for delivering said output signal;
said compensation arrangement generating an output signal of a frequency which is substantially equal to said predetermined frequency of said output signal generated by said coherent oscillator and which is modulated by said frequency of said output signal delivered by said means for delivering said output signal;
a phase discriminator having two inputs and an output;
a first one of said two inputs of said phase discriminator being operatively connected to said antenna and receiving therefrom said reflected radiation from the moving target vehicle;
a second input of said two inputs of said phase discriminator being connected to said compensation arrangement and receiving said output signal generated by said compensation arrangement; and
an evaluation circuit connected to said output of said phase discriminator and evaluating an output signal received from said phase discriminator in order to thereby determine the speed of said target vehicle.

* * * * *